Dec. 28, 1965   C. J. DETTLING ETAL   3,226,245
COATING METHOD AND APPARATUS
Filed Feb. 5, 1958                       2 Sheets-Sheet 1
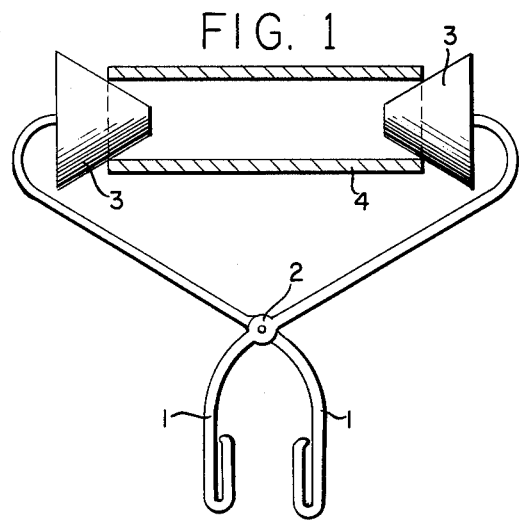
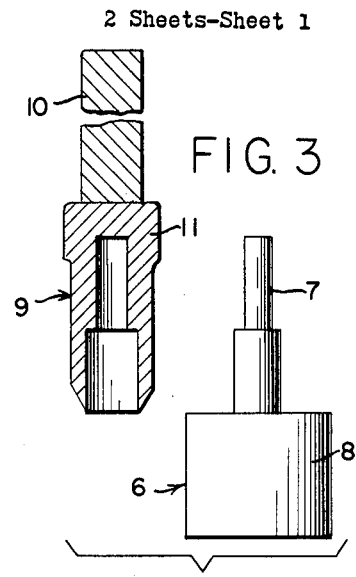
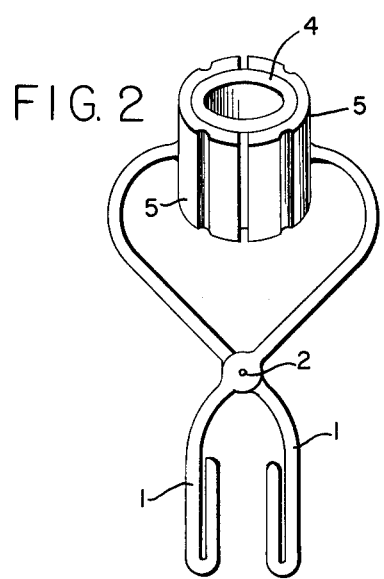
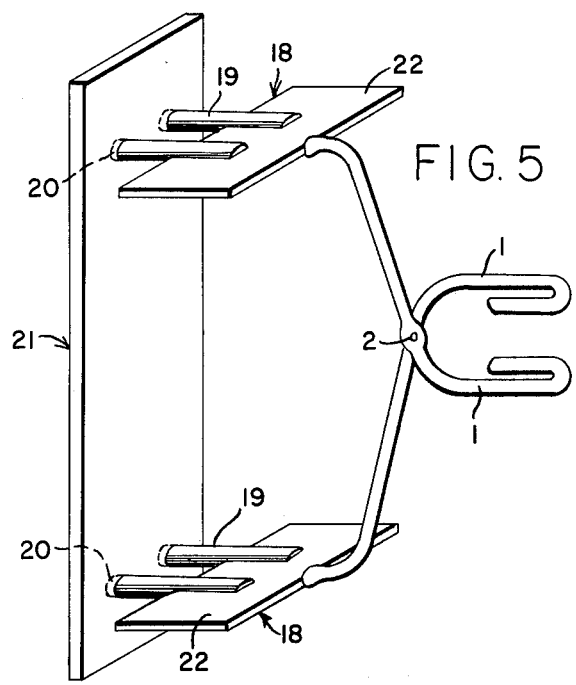
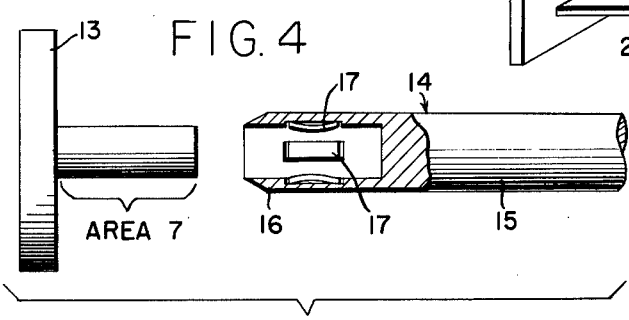
INVENTORS
CONRAD J. DETTLING
ROBERT C. RAMSAY
ATTORNEY

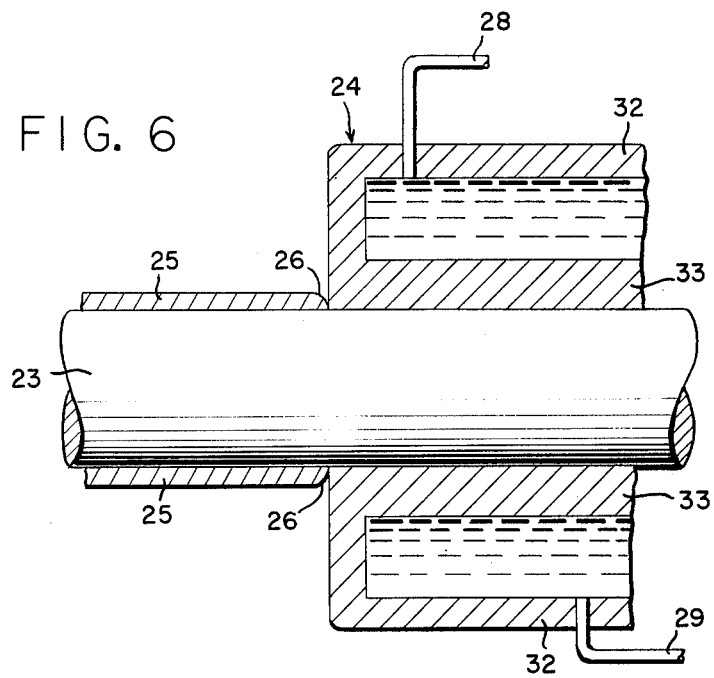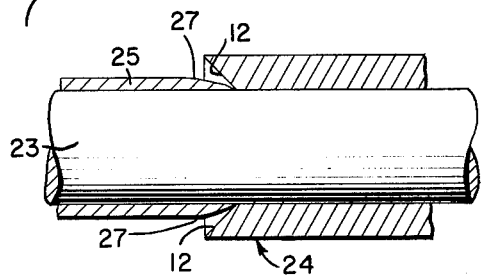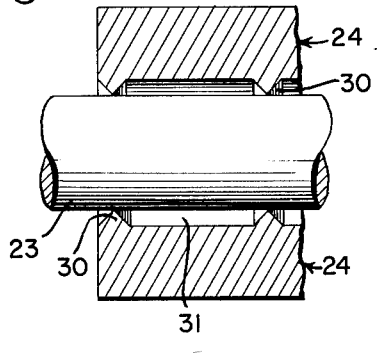

United States Patent Office 3,226,245
Patented Dec. 28, 1965

3,226,245
COATING METHOD AND APPARATUS
Conrad J. Dettling and Robert C. Ramsay, Reading, Pa., assignors to The Polymer Corporation, a corporation of Pennsylvania
Filed Feb. 5, 1958, Ser. No. 713,332
18 Claims. (Cl. 117—21)

This invention relates to protective coatings and to methods for effecting coating. More particularly, it relates to holding devices for handling heated articles before, during and after coating.

As is known, articles can be coated by the use of fluidized beds. The coating material in powder form is placed in a fluidized state and the article to be coated is heated to a temperature equal to or above the softening or melting point of the coating material, is then placed in the dense phase of the bed, moved to and fro, and removed when the desired coating thickness is attained, as is disclosed in British Patent No. 759,214.

A fluidized bed has been defined as a mass of solid particles which exhibits the liquid-like characteristics of mobility, hydrostatic pressure, and an observable upper free surface or boundary zone across which a marked change in concentration of particles occurs. A fluidized bed differs from a dispersed suspension in that in the suspension an upper level or interface is not formed under conditions of continuous solids entrainment and uniform superficial velocity. In general, a dispersed suspension is analogous to a vapor, whereas a fluidized bed is analogous to a liquid. In a vessel containing a fluidized bed a dilute suspension of entrained particles above the bed also is such a dispersed suspension, and is referred to as the disperse phase, while the bed itself is referred to as the dense phase.

The use of such beds has provided superior coatings as well as new processes which avoid certain difficulties of old methods. For example, it is possible to coat articles of irregular and complex shapes very quickly and simply and yet attain uniformity in spite of shape differentials. Also, solvents and similar materials needed in prior methods are obviated. However, a problem is encountered in fluidized techniques in handling the hot articles that are to be coated. In placing the article to be coated in the bed, the article is heated uniformly in order to get uniform coating. Therefore, generally the entire article is heated. Many of the articles, for example, wrenches, pliers, racks, gears, hooks and the like are to be coated only in certain areas. Since the portions to be left uncoated are hot, undesirable coating will occur on those portions unless special precautions are taken. Then, again, the manner in which or the device by which the surface to be coated is held may cause variations in the coating. For example, some holding devices cause heat to be removed from the area to be coated at a rate which adversely and variously effects the deposition of the coating material. For volume production uniformity of results is required.

Accordingly, an object of this invention is the provision of apparatus and methods for avoiding the above stated difficulties. Another objective is the provision of a means and a method for holding articles in fluidized beds so that the article to be coated is coated only at desired areas. A still further objective is the provision of a holder and a method of holding which leads to a uniform, well-defined boundary line between the area to be coated and the area to remain uncoated. These and other objects will appear hereinafter.

These objectives are accomplished by the provision of holders which are clamps having a covering area corresponding in size and shape to the area of the article that is to remain uncoated or corresponding to the area that is to be blocked to prevent access of coating materials to other areas. The clamp in these holding parts is constructed of materials which under the coating conditions used are resistant to penetration by the coating material and these holding parts of the clamp act as a mask during the coating step. This invention provides a holder which, in its clamping or masking part, is cold or colder than the heated article. A very particular, outstanding advantage attends the use of such cold holders in that the coating tapers down to nothing in the vicinity of the mask. Such tapered edges are highly desirable as they afford a desirable appearance and considerable resistance to abrasion and resistance to edge peeling. In some instances, the holders of this invention are provided with built-in cooling systems. Thus, the devices of this invention comprise holders that have lever, magnet, spring or spring activated sections which provide the holding action and for contacts for holding and masking solid or split surfaces, pins, and clamps. The various clamping surfaces have covering areas corresponding at least to the area that is to be blocked or masked. This area may be a comparatively large outer surface, or it may be a smaller surface which is used to prevent access of coating material to other areas, such as interior surfaces. Pressure is exerted through the clamps to hold the article, and the clamps or those portions of the device contacting the heated article or being close to it are kept colder than the sintering temperature of the coating material.

The end walls of the clamps or holding sections of the device preferably form at least a right angle with the article at the holding boundary. The result of these various factors is the formation of a coating which has a taper at its extremities. These tapered edges are effected much less by the scuffing, rubbing and abrasion actions encountered during use. The coated article can be used for long periods of times without tearing, stripping or dislodging the coating from the article. This invention will be further understood by reference to the description below and to the figures of which:

FIGURE 1 shows a holder of this invention used for handling tubes so as to mask the inside surfaces, the tube being shown in cross-section;

FIGURE 2 is a perspective of a tube or rod handling holder used for holding the article and masking an outside portion thereof;

FIGURE 3 shows in section a holder of this invention equipped with a magnetic grip;

FIGURE 4 shows a holder similar to that in FIGURE 3 but having a clip or spring grip;

FIGURE 5 depicts a pin type holder of this invention.

FIGURE 6 is a sectional view showing a tapered coating produced in this invention and shows a holder having internal cooling means;

FIGURE 7 is a sectional view showing a holder used to produce increased tapering at the edge of the coating; and FIGURE 8 is a view showing in cross section a holder having line contacts with the article being processed.

Referring to FIGURE 1, a pair of handles 1 is connected at pivot point 2 and at their extremities are conical or tapered sections 3. These fit into the ends of open-ended articles such as tube 4. These inserts 3 can be of any desired shape. The inserts prevent coating of the inside of the tubing or hollow member, and they can be, if desired, constructed with angled extensions to prevent the coating of the rims of the tubes. The tube 4 is preheated to the desired temperature. When the tube is at the desired temperature, the operator picks it up with the cold holder and carries it to the fluidized bed and immerses it in the dense phase of the bed for such time as is necessary, usually about 5 to 10 seconds. With the article held by the holder, a plurality of dippings can be made, and the coated article may then be post heated, if required for complete coating fusion.

In certain instances it is desired to mask a portion or the entire outside surface of an article while coating the interior. As shown in FIGURE 2, the tongs have split cylindrical portions 5 which when brought together around the article to be coated completely cover the outside of the object except for the rim. This rim can be protected also by having an extension coming from the masking portion 5 over the rim and terminating at the inside diameter of the tube 4. While the entire outside walls of the tube 4 shown in FIGURE 2 are enclosed by the masking and holding sections 5, it should be recognized that the tube can extend beyond the extremities of the clamps 5. In other words, a long object can be picked up by such a holder as shown in FIGURE 2 in such a way that any desired portion of the outside surface can be masked.

Frequently, an object such as an armature 6 shown in FIGURE 3 will have a certain outside portion that is to be coated and another outside portion that must be kept free of coating. Thus, the shaft sections 7 of the armature are to be kept uncoated while the coil section 8 is coated. A holder 9 is comprised of a handle section 10 and a gripping section 11. The gripping section comprises a tubular member having an internal bore which corresponds closely to the dimensions of the shaft portion 7 of the armature. The entire holding section 11 of holder 9 may be magnetic, preferably electromagnetic. The contact between magnetic element and the metallic portions of shaft 7 provides for excellent holding.

In FIGURE 4, a plan view, is shown an article of which shaft 7 is to be protected while section 13 is to be coated. The holder 14 comprises handle section 15 and gripping and masking section 16, as shown with a section broken away to illustrate the internal arrangement of the gripping section 16. Within this section are spring members or clips 17. Upon inserting the shaft 7 into the gripping section 16, the spring grips 17 provide for a secure mechanical engagement. Coating of the exposed portions of the holders of this invention either does not occur at all or is negligible. Such portions usually are not heated to a temperature that is high enough to cause the melting or softening of the coated material.

Shown in FIGURE 5 is a type of a holder which can be used to hold any object that has small openings in it. The tongs have at their extremities gripping members 18 which comprise a pin or pins 19 which can be inserted snugly into the openings 20, which are frequently threaded, in the article 21 that is to be coated. These pins can be mounted in any convenient fashion to the tongs as, for example, by attachment to a plate 22 which in turn is held by the tongs 1. The plate 22 can be of any desired length and can bear a plurality of pins so that a plurality of such articles as article 21 can be held and treated at one time.

The holding portions of the holder of this invention are devised so that the entire surface that is to be coated can be coated in one immersion step. The coating is effected very neatly and precisely right up to the boundary edge lying between the holding element and the article being held.

The tapering is shown in FIGURE 6. The article 23 that is being held by the holder 24 has been coated on both sides, the coating being designated at 25. The walls of the holder 24 extend essentially perpendicular outwardly from the substrate surfaces so that a right angle corner is formed. It has been found that with the holders of this invention the pulverulent powder deposits very uniformly in the tapered manner 26 shown without departure from normal dipping techniques.

The tapering can be increased by inclining the wall or ends of the holder to form an oblique angle, as shown at 12 in FIGURE 7. The taper 27 is more gradual and as before it tapers down to nothing or a fine edge right at the holding boundary line.

A factor that is important in the tapering effect is the coldness or relative coldness of the holders of this invention. The holders are cold or are kept cold during the contact. Usually, the holder is a reasonably massive piece with respect to the section or area being held, so that the hot article does not heat up the holder seriously during the short coating period. The holders may also be provided with built-in cooling means. For example, hollow tongs or handles and/or hollow holding sections may be provided to receive tap water either under its own head of pressure or by hose connections to tap pressure. In some instances, an inlet and outlet tube are provided to permit greater circulation of the coolant. Such a device is shown in FIGURE 6 in which the holding sections 32 of the holder are hollow members. To one side by inlet or flexible pipe or hose 28 is fed a liquid coolant, usually water. Oppositely located to effect greatest circulation is located outlet 29. Thus, the parts 33 actually contacting the hot article are kept cold in a continuous manner.

Still another way to keep the holder cold is to use line contacts as shown in FIGURE 8. In the device shown there the holder has knife edge contacts 30 which prevent the flow of heat to the holder. The air gap 31 acts as an excellent insulator. Most frequently, the holders of this invention when being in successive use are quenched in a trough of water to assure the use of a cold holder in the next operation.

The devices of this invention can be used irrespective of the means used for heating the articles. Any convenient method for heating may be used such as by using a convection oven, an infra-red oven, or induction heating. The holders of this invention may be constructed of metals such as steel, aluminum, brass or other commonly available metals or alloys. Accordingly, as used in this specification, the term "cold holder" or "cold holding and masking device" generally means simply that the holder or holding and masking device is kept at a temperature below the sintering or melting temperature of the coating material so that no coating is formed upon the holder or masking device.

By this invention coating material deposits on the holder are avoided. These have been in the past most troublesome, because when the holder was removed, tearing of the desired coating would result and the holders always had to be cleaned. Many times, total encapulation of an article is not wanted, and this invention provides excellent, effective masking means. The combination of cold holding and masking is most valuable for it affords a way to handle articles in volume.

Prior masking techniques have often involved the provision of a separable covering for the portion of the article on which a coating is not desired, said separable covering consisting, for instance, of a material which is capable of withstanding the preheating temperatures such as a metal foil. In such prior masking techniques, the metal foil was coated as well as the exposed surfaces of the article upon which a coating was desired. It was then necessary to painstakingly cut the connection formed by the coating between the surface upon which a coating is desired and the extension of the coating onto the masking foil so that the foil could be peeled free from the surface upon which coating is not desired. Not only was this procedure time consuming and expensive, but the cut edge of the coating remaining upon the article is quite vulnerable and subject to possible damage. This edge is particularly vulnerable to the possibility of pulling loose on the surface of the article, and such a loosening or commencement of peeling can be of serious consequence for the entire coating. The present invention avoids this problem as has been established above. Time is saved and uniform, well-tapered coatings are obtained.

While the invention has been disclosed herein in connection with certain embodiments and certain procedural details, it is clear that changes, modifications or equivalents can be used by those skilled in the art; accordingly, such changes within the principles of this invention are intended to be included within the scope of the claims below.

We claim:

1. A device for holding an article which is to be coated and for concurrently masking a section of the article which is not to be coated, said device being especially adapted for coating the article by dipping said article in a fusible, pulverulent coating material while said article is at a temperature above the sintering temperature of the pulverulent coating material, said device comprising a body portion arranged and shaped to engage and cover a section of the article which is to be masked, and said device being adapted to engage the article to be coated by frictional contact between the outer surface of the article and said body portion, said body portion having means for maintaining it at a temperature below the sintering temperature of the coating material and for causing it to be resistant to penetration by the coating material.

2. A holder for an article that is to be partially coated with a coating material comprising means for holding said article in the areas to remain uncoated, means to mask these areas, said holding means being adapted to engage the article to be coated by frictional contact between the outer surface of the article and said holding means, and means to keep said holder in its said holding and masking zones colder than the sintering point of said coating material.

3. A holder in accordance with claim 2 in which the said holding means comprises pressure means.

4. A holder in accordance with claim 2 in which said holding means comprises a line contact holding means.

5. A holder in accordance with claim 2 in which said cooling means comprises a liquid coolant.

6. A holder in accordance with claim 2 in which the end walls of the said holder form an acute angle with the adjacent surfaces of the article.

7. A device for holding an article which is to be coated by immersion in powdered, fusible coating material while at the same time masking a portion of the article on which a coating is not desired comprising a holder body having a substantial thermal mass which enables it to be maintained at a temperature below the sintering temperature of the coating material, said body having reduced cross-section knife edge protrusions shaped and arranged to engage the article which is heated for coating by fusion of coating material thereon, said knife edge protrusions being arranged to completely engage and enclose the portions of the surface of the article which are not to be coated.

8. A method for applying a coating to a limited portion of the surface of an article comprising the steps of heating the article to a temperature above the melting temperature of a pulverulent coating material, engaging said article with a holding device which covers and encloses all portions of the article on which a coating is not desired, immersing the article in the pulverulent coating material so that the coating material in proximity to the article surface sinters and fuses into a complete coating, and during the immersion maintaining the holding device at a temperature below the sintering temperature of the coating material.

9. A method of claim 8 in which the holding device engages the article to be coated in a line contact.

10. A method in accordance with claim 8 which includes producing tapering at the edges of the coating by providing that the angle formed between the end walls of the holding device and the adjacent surfaces of the article be substantially perpendicular.

11. A method in accordance with claim 8 in which the pulverulent coating material is in the form of a fluidized bed.

12. A method, for coating a portion of the surface of an article with a fusible coating material so that the coating has tapered edges, which comprises heating said article above the temperature of the sintering point of said coating material; seizing the article with a device that has clamps that completely block that portion of the said article that is to remain uncoated, thereby masking that portion; exerting pressure through said clamps to hold said article; keeping said clamps contacting said article and exposed to said coating material at a temperature below the sintering point of the said coating material; and contacting the resultant clamped, masked and heated article with the fusible, pulverulent coating material.

13. A method in accordance with claim 12 in which the said clamps are provided with ends that make at least a right angle with the surface of the articles at the boundaries.

14. A method for applying a resin coating to a limited portion of the surface of an article comprising the steps of heating the article to a temperature above the melting temperature of a pulverulent resin coating material, engaging said article with a device which covers and encloses portions of the article on which a coating is not desired, contacting the article with the pulverulent resin coating material so that the resin coating material in proximity to the article surface sinters and fuses into a complete coating, and during the period of contact maintaining the holding device at a temperature below the sintering temperature of the resin coating material.

15. A method for applying a resin coating to a limited portion of the surface of an article comprising the steps of heating the article to a temperature above the melting temperature of a pulverulent resin coating material, said pulverulent coating material being in the form of a fluidized bed, engaging said article with a device which covers and encloses portions of the article on which a coating is not desired, contacting the article with the pulverulent resin coating material so that the resin coating material in proximity to the article surface sinters and fuses into a complete coating, and during the period of contact maintaining the holding device at a temperature below the sintering temperature of the resin coating material.

16. In a process for coating a member with resin wherein the member is immersed in powdered resin, maintained at a temperature above the melting point of the resin for a predetermined period, and withdrawn; the improvement which consists of placing a relatively thick metal masking member which is at room temperature on the surface of said member while said member is above the melting point of said resin, and suspending said member and masking member in said resin for a period insufficient for said masking member to reach the melting point of said resin, but sufficient to coat said member, and discontinuing the immersion.

17. In a process for coating an object with resin wherein the object is immersed in powdered resin, maintained at a temperature above the melting point of the resin for a predetermined period, and withdrawn; the improvement which comprises masking any part of the object which is not intended to be coated with a metallic masking member, and suspending said object and masking member in said resin for a period insufficient for said masking member to reach the melting point of said resin, but sufficient to coat said object, discontinuing the immersion, and curing said resin.

18. In a process for coating an object with resin wherein the object is immersed in powdered resin, maintained at a temperature above the melting point of the resin for a predetermined period, and withdrawn, the improvement which consists of placing a mask which is at room temperature on an object while said object is above the melting point of said resin, said mask being placed on any surface thereof which is not intended to be coated, and suspending said object and mask in said resin for a period insufficient for said mask to reach the melting point of said resin but sufficient to coat said object, discontinuing the immersion, and curing said resin.

References Cited by the Examiner

UNITED STATES PATENTS

| | | | |
|---|---|---|---|
| 1,354,930 | 10/1920 | Williams | 118—500 |
| 1,704,548 | 3/1929 | Alberg | 81—415 |
| 2,103,270 | 12/1937 | Murch. | |
| 2,364,986 | 12/1944 | Law | 118—504 X |
| 2,844,489 | 7/1958 | Gemmer | 117—21 |

FOREIGN PATENTS

| | | |
|---|---|---|
| 718,856 | 3/1942 | Germany. |
| 195,540 | 4/1923 | Great Britain. |

RICHARD D. NEVIUS, *Primary Examiner.*